United States Patent [19]

Zychowski, Edwin A. et al.

[11] 4,440,894

[45] Apr. 3, 1984

[54] THERMOSETTING VINYL ACETATE TETRAPOLYMER COATINGS

[75] Inventors: Zychowski, Edwin A., Des Plaines; Kenneth E. Jasenof, Skokie; Artemio L. Jimenez, Hanover Park, all of Ill.

[73] Assignee: DeSoto, Inc., Des Plaines, Ill.

[21] Appl. No.: 433,389

[22] Filed: Oct. 8, 1982

[51] Int. Cl.$^3$ .............................. C08F 00/000
[52] U.S. Cl. ...................... 524/390; 524/512; 524/765; 524/853; 526/317
[58] Field of Search ............... 526/317; 524/512, 390, 524/558, 853, 765

[56] References Cited

U.S. PATENT DOCUMENTS

| | | | |
|---|---|---|---|
| 3,208,963 | 9/1965 | Jasinski | 524/558 |
| 3,311,583 | 3/1967 | Bearden | 526/317 |
| 3,763,117 | 10/1973 | McKenna | 524/558 |
| 3,926,888 | 12/1975 | Cheung | 524/512 |
| 4,126,595 | 6/1982 | Martorano | 524/512 |
| 4,338,379 | 7/1982 | Strolle | 524/512 |

*Primary Examiner*—C. Warren Ivy
*Attorney, Agent, or Firm*—Dressler, Goldsmith, Shore, Sutker & Milnamow

[57] ABSTRACT

Thermosetting solvent solution coating compositions are disclosed which form hard and impact resistant baked coatings of good gloss retention on exterior exposure. These compositions comprise a butanol-containing solvent having dissolved therein a solution copolymer obtained by copolymerizing from 55% to 75% of vinyl acetate with from 15% to 40% of $C_2$–$C_8$ hydroxyalkyl acrylate or methacrylate, from 3% to 10% of $C_2$–$C_4$ hydroxyalkyl acrylate or methacrylate, and from about 0.5% to about 5% of copolymerizable monoethylenically unsaturated carboxylic acid in organic solvent medium consisting essentially of a butanol at a solids content of at least 65%. This copolymer is used in admixture with a polyalkoxy-methyl melamine in an amount of from 8% to 20%, based on the mixture.

9 Claims, No Drawings

THERMOSETTING VINYL ACETATE TETRAPOLYMER COATINGS

DESCRIPTION

Technical Field

This invention relates to thermosetting solvent solution coatings intended for application to metal substrates to provide hard, flexible and glossy finishes adapted to sustain extended exterior exposure.

BACKGROUND ART

The provision of thermosetting coatings which are organic solvent solutions of acrylic copolymers which thermoset to provide hard, flexible and glossy weather-resistant finishes is known, but the acrylic monomers are expensive, so it is desired to minimize their use. It is also known that vinyl acetate (which is less costly) may be included in the acrylic copolymers, but when this is done to any significant extent, and especially when more than half of the copolymer is vinyl acetate to achieve a desirable economy, the properties fall off and become less satisfactory. The characteristic of prime significance is the combination of adequate hardness with good impact resistance, for this is where vinyl acetate-containing copolymers are particularly weak. Weather resistance (especially the maintenance of gloss on extended exterior exposure) is also important. The thermosetting acrylic coatings now in use for the subject purpose possess only moderate gloss retention on extended ultraviolet exposure.

A primary object of this invention is to employ large amounts of vinyl acetate in a thermosetting system which combines good hardness (at least about a pencil hardness of F-H) with the capacity to sustain at least about 40 inch-pounds of reverse impact, and which also possess good weather resistance as evidenced by good gloss retention on long term ultraviolet exposure.

DISCLOSURE OF INVENTION

In accordance with this invention, it has been found that when from 55% to 75% of vinyl acetate is copolymerized in organic solvent solution medium consisting essentially of a butanol at a solids content of at least 65% with from 15% to 40% of $C_2-C_8$ alkyl acrylate or methacrylate (preferably a butyl acrylate or methacrylate), from 3% to 10% of $C_2-C_4$ hydroxyalkyl acrylate or methacrylate, and from about 0.5% to about 5% of monoethylenically unsaturated copolymerizable acid, desirably acrylic or methacrylic acid, and when this copolymer solution is mixed with 8% to 20% of polyalkoxymethyl methyl melamine to provide a thermosetting coating composition, that the cured films possess a remarkably favorable combination of hardness and flexibility of a character normally associated with all acrylic copolymer systems, and that excellent weather resistance is also provided. The large amount of vinyl acetate in this balanced system produced in the manner specified does not confer the usual diminished properties in which adequately hard films are brittle and adequately flexible films are too soft, but it does provide a significant economy. Superior weather resistance is also obtained.

In the foregoing description of this invention, the term "a butyl" embraces n-butyl, isobutyl, t-butyl, and mixtures thereof. Similarly, the term "a butanol" embraces n-butanol, isobutanol, t-butanol, and mixtures thereof. It is the $C_4$ alkyl group which is of prime importance, not its isomeric form.

Throughout this application, and in the claims which follow, all proportions are by weight, unless otherwise stated.

The polymers used herein are solution copolymers, which means that the monomers are dissolved in an organic solvent and polymerized in solution to form a solvent-soluble copolymer. The coating compositions of this invention contain the copolymers in organic solvent solution. The copolymerization must be carried out at high solids content and a butanol must be selected to provide the polymerization solution. These factors importantly influence the copolymerization is unknown fashion to modify the characteristics of the vinyl acetate-acrylic copolymers described herein to provide coatings which cure with a precise proportion of polyalkoxymethyl melamine to provide the improved properties which have been described. At least about 80%, preferably at least about 90%, of the solvent in the copolymerization solvent solution must be a butanol, and the solids content must be at least 65% as the bulk of the copolymerization takes place. Changing the solvent medium without any other change, for example, by using 2-butoxy ethanol in place of n-butanol, reduces the hardness and simultaneously impairs the impact resistance. The preferred solids content is 70% to 75%.

The copolymerization is otherwise a conventional one being conveniently carried out at reflux temperature in the presence of a free radical polymerization catalyst, such as benzoyl peroxide, cumene hydroperoxide or azobisisobutyronitrile. The temperature conditions are not critical and the copolymerization will be illustrated hereinafter.

The hydroxy alkyl acrylate or methacrylate is a costly component, so proportions thereof in excess of 10% are undesirable. To maintain adequate hardness in the absence of an excessive proportion of the hydroxy-functional component, it is preferred to employ from 65% to 72% of vinyl acetate.

Referring more particularly to the alkyl acrylate or methacrylate, it is preferred to employ 20% to 25% of this component. While a butyl acrylate is preferred, illustrated herein by n-butyl acrylate, other monomers within this class are illustrated by ethyl acrylate, isobutyl acrylate and 2-ethylhexyl acrylate.

The preferred hydroxy-functional monomer is hydroxyethyl methacrylate. This is preferably used in an amount of from 6% to 9%. 2-hydroxy butyl acrylate and 2-hydroxy propyl methacrylate will further illustrate these monomers.

At least about 0.5% of monoethylenic carboxylic acid is needed for the high gloss systems which are desired. The preferred proportion of acid is from 1% to 3%.

The polyalkoxymethyl melamine should have at least about three alkoxymethyl groups. Hexamethoxymethyl melamine is useful, as are similar compounds in which a substantial proportion of amino hydrogen is left unreacted. Any volatile monohydric alcohol may be used to provide the alkoxy portion of the alkoxymethyl group, methyl and/or ethyl alcohols being preferred. This component preferably is used in an amount of 10% to 15%.

The compositions of this invention are thinned to coating viscosity, and this is conveniently done by the addition of aromatic hydrocarbons. These may be present in commercial mixtures as illustrated in the examples.

The coatings of this invention are normally pigmented, especially with titanium dioxide, rutile. Typical pigmentation involves a pigment to binder ratio of 0.4:1 to 1.5:1, preferably 0.6:1 to 1.2:1.

The coatings of this invention may be applied in any desired fashion, as by air, electrostatic or other type of spray or by roller coating, and any surface may be coated, especially metal surfaces, such as steel. Typical coating thicknesses are 0.2–5 mils, preferably 0.4–2 mils. The applied coatings are usually baked to cure the same using baking conditions of from 30 seconds to 1 hour at a temperature of from 550° F. to 300° F., the faster times being at the higher temperatures.

The invention is illustrated in the Examples which follow.

EXAMPLE 1

33.7 parts of n-butanol were charged to a flask equipped with thermometer, agitator, condenser and dropping funnel. The dropping funnel was charged with a monomer mixture containing 70 parts of vinyl acetate, 21 parts of n-butyl acrylate, 7 parts of 2-hydroxyethyl methacrylate, 2 parts of acrylic acid, 0.5 parts of benzoyl peroxide and 0.5 parts of t-butyl perbenzoate. The solvent in the flask was heated to 100° C. using a heating mantle. The contents of the dropping funnel were slowly added to the hot solvent in the flask over a period of 4–5 hours, reflux temperature being maintained by the heating mantle. After addition was completed, the contents of the flask were held at reflux temperature for four hours to insure conversion of monomer to copolymer. Then the flask was cooled to 50° C. and 20.7 parts of SC-150 (a commercial mixture of aromatic hydrocarbon solvents) were added to this the solution to approximately 65% nonvolatile solids content. The polymer solution so-produced had a viscosity of about 55 poise and a weight per gallon of 8.5 pounds per gallon.

EXAMPLE 2

Example 1 is repeated except the 33.7 parts of n-butanol are replaced by 33.7 parts of 2-butoxy ethanol. The resulting solution again had a nonvolatile solids content of 65%.

EXAMPLE 3

150 parts of the polymer solution of Example 1 were combined with 60 parts of SC-150 and 300 parts of titanium dioxide, rutile, and the mixture is ground to a grind rating of 7 to 7½ on the North Shore scale. This grind is then let down with 275 parts of the solution of Example 1, 175 parts of SC-150 and 50 parts of a polymethoxymethyl melamine having a large residual —NH content. The American Cyanamid Co. product 325 can be used for this last-named component.

The product has a #4 Zahn cup viscosity of 25 seconds and it was applied by a #34 wire wound rod onto aluminum panels. The coated panels were baked in a 520° F. oven for 30 seconds, attaining a peak metal temperature of 450° F.

EXAMPLE 4

Example 3 is repeated using the solution of Example 2 in place of the solution of Example 1.

EVALUATION

|  | Example 3 | Example 4 |
| --- | --- | --- |
| methyl ethyl ketone double rubs | 100 | 10 |
| 40 inch-pounds reverse impact | no crack | crack |
| Pencil hardness | F-H | B |
| T Bend - 1T | slight pick off | pick off |
| 60° Gloss % | 81 | 60 |
| Mar resistance | good | fair |

The product of Example 3 retained 84% of its gloss after 500 hours of Fluorescent Ultraviolet exposure, whereas the thermosetting acrylic coatings now used in commerce for this same purpose retained only 38% of its gloss. As a result, less costly resins have been provided which possess the same good balance of hardness and impact resistance and which possess better resistance to ultraviolet light exposure. After 1000 hours of exposure, the acrylic coating retained only 21% of its original gloss, while the coating of Example 3 still had 36% of its original gloss.

What is claimed is:

1. A thermosetting solvent solution coating composition characterized by forming hard and impact resistant baked coatings of good gloss retention on exterior exposure comprising, an organic solvent medium comprising a butanol having dissolved therein a solution copolymer obtained by copolymerizing from 55% to 75% of vinyl acetate with from 15% to 40% of $C_2$–$C_8$ alkyl acrylate or methacrylate, from 3% to 10% of $C_2$–$C_4$ hydroxyalkyl acrylate or methacrylate, and from about 0.5% to about 5% of copolymerizable monoethylenically unsaturated carboxylic acid in organic solvent solution medium consisting essentially of a butanol at a solids content of at least 65%, said copolymer being in admixture with from 8% to 20%, based on the mixture, of a polyalkoxymethyl melamine with a volatile alcohol.

2. A coating composition as recited in claim 1 in which said vinyl acetate is present in an amount of from 65% to 72%.

3. A coating composition as recited in claim 2 in which said alkyl acrylate or methacrylate is a butyl acrylate.

4. A coating composition as recited in claim 1 in which said copolymer is formed by copolymerization at a solids content of 70% to 75%.

5. A coating composition as recited in claim 1 in which the melamine used is a polymethoxymethyl melamine present in an amount of 10% to 15% of the mixture.

6. A coating composition as recited in claim 3 in which the hydroxy acrylate or methacrylate is 2-hydroxyethyl acrylate or methacrylate used in an amount of 6% to 9%.

7. A coating composition as recited in claim 1 in which said composition is reduced to coating viscosity with aromatic hydrocarbons.

8. A coating composition as recited in claim 1 in which said composition is pigmented in a pigment to binder weight ratio of 0.4:1 to 1.5:1.

9. A coating composition as recited in claim 1 in which said carboxylic acid is acrylic acid or methacrylic acid used in an amount of 1% to 3% and said alkyl acrylate or methacrylate is used in an amount of 20% to 25%.

* * * * *